April 15, 1947.                R. M. STRONG                 2,419,178
         ELECTRIC MOTOR CONTROL FOR SERIES-PARALLEL OPERATION
                        Filed Sept. 18, 1942
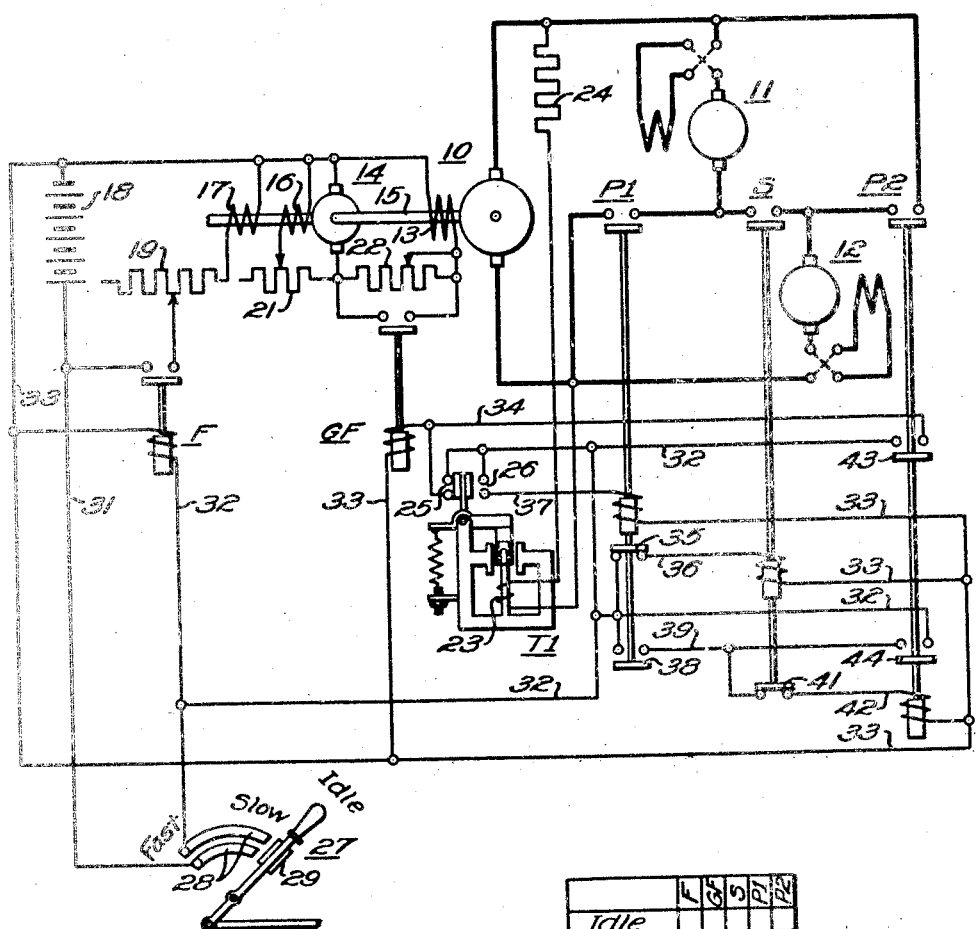
INVENTOR
Robert M. Strong.

Patented Apr. 15, 1947

2,419,178

UNITED STATES PATENT OFFICE 2,419,178

ELECTRIC MOTOR CONTROL FOR SERIES-PARALLEL OPERATION

Robert M. Strong, Wilkinsburg, Pa., assignor to Westinghouse Electric Corporation, East Pittsburgh, Pa., a corporation of Pennsylvania Application September 18, 1942, Serial No. 458,895

8 Claims. (Cl. 172—239)

My invention relates, generally, to control systems and, more particularly, to systems for controlling the operation of Diesel or gas-electric locomotives.

On Diesel-electric locomotives of certain types the motor connections are changed from series to parallel to obtain full engine loading at high locomotive speeds. The change of connections, commonly known as "transition," is usually performed automatically by means of a relay set to operate at a predetermined voltage. However, the transition is performed automatically only when changing the motor connections from series to parallel and not from parallel back to series. Thus, it is necessary to rely on the operator to shut off and reapply power, thereby changing from parallel to series, whenever an upgrade is encountered or for any reason the locomotive is slowed down to a speed below the transition point. Since the parallel connection requires twice the generator current required for the series connection; there is danger of burning out the generator by operating above the continuous current rating if the operator fails to change the motor connections from parallel to series when operating below the proper speed for parallel operation.

An object of my invention is to provide for automatically controlling the transition of electric motors.

Another object of my invention is to provide for automatic transition from series to parallel and from parallel to series-circuit relation.

A further object of my invention is to provide a simplified and improved system for automatically controlling the transition of electric motors.

A more general object of my invention is to provide an automatic transition system which shall be simple and efficient in operation and which may be economically manufactured and installed.

Other objects of my invention will be explained fully hereinafter or will be apparent to those skilled in the art.

In accordance with my invention the transition of the motors of a locomotive from series to parallel-circuit relation is controlled by a relay responsive to the voltage of the generator which supplies current to the motors and the reverse transition from parallel to series-circuit relation is controlled by the same relay in cooperation with interlocking members on the switching means for controlling the motor connections.

For a fuller understanding of the nature and objects of my invention, reference may be had to the following detailed description, taken in conjunction with the accompanying drawing, in which:

Figure 1 is a diagrammatic view of a control system embodying my invention, and

Fig. 2 is a chart showing the sequence of operation of certain of the switches illustrated in Fig. 1.

Referring to the drawing, the system shown therein comprises a generator 10 for supplying current to a plurality of motors 11 and 12, which are of a type suitable for propelling a locomotive or other vehicle. The generator 10 is provided with a field winding 13 which is energized by an exciter 14. The generator 10 and exciter 14 are connected to a common shaft 15 which may be driven by an internal combustion engine (not shown). The exciter 14 is provided with a self-excited field winding 16 and a separately excited field winding 17 which is energized from a battery 18.

A switch F is provided for connecting the field winding 17 across the battery 18, and a variable resistor 19 is provided for adjusting the current permitted to flow through the field winding 17. A variable resistor 21 is provided for adjusting the excitation current in the field winding 16 of the exciter 14 and a variable resistor 22 is provided for adjusting the excitation current in the field winding 13 of the generator 10. A switch GF is provided for shunting the resistor 22 from the circuit for the field winding 13 during most of the operating cycle, as will be explained more fully hereinafter.

In accordance with the usual practice in Deisel-electric locomotives, a switch S is provided for connecting the motors 11 and 12 in series-circuit relation during starting of the train hauled by the locomotive, and switches P1 and P2 are provided for connecting the motors in parallel-circuit relation when the locomotive attains a predetermined speed.

In order that the transition from series to parallel-circuit relation may be automatically effected when the locomotive is operating at the proper speed, a relay T1 is provided for controlling the operation of the transition switches. The relay T1 is provided with an actuating coil 23 which is connected across the armature of the generator 10 through a resistor 24. The relay is, therefore, responsive to the generator voltage which, in turn, is proportional to the speed of the locomotive.

In order that the transition from parallel to series-circuit relation may also be automatically controlled, the relay T1 is provided with two sets of contact members 25 and 26 which cooperate with interlock members carried by the transition switches to so control the operation of these switches that the motor connections are changed from parallel back to series-circuit relation in case the speed of the locomotive, and hence the generator voltage, falls below the normal speed for parallel operation. In this manner, overloading of the generator is prevented, since the reverse transition, as well as the forward transition, are both automatically controlled and are not dependent upon the operator of the locomotive.

The usual throttle controller 27 is provided for controlling the governor setting or the supply of fuel to the engine which drives the generator 10 and exciter 14. The controller 27 is provided with contact members 28 which are bridged by a contact member 29 when the throttle controller is actuated to an operating position.

In order that the functioning of the foregoing apparatus may be more clearly understood, the operation of the system will now be described in more detail. Assuming that it is desired to apply power to the motors 11 and 12 to start the locomotive, the throttle controller 27 is actuated from the idling position to an operating position, thereby increasing the speed of the engine which drives the generator 10 and exciter 14.

When the controller 27 is actuated to an operating position, the switches F, GF and S are closed to energize the field windings 17 and 13 of the exciter 14 and generator 10, respectively, and to connect the motors 11 and 12 across the generator 10 in series-circuit relation.

The energizing circuit for the actuating coil of the switch F may be traced from the positive terminal of the battery 18 through conductor 31, the contact members 28 which are bridged by contact member 29 of the controller 27, conductor 32, the actuating coil of the switch F and conductor 33 to the negative terminal of the battery 18. The energizing circuit for the switch GF extends from the conductor 32 through the contact members 25 of the relay T1, conductor 34 and the actuating coil of the switch GF to the negative conductor 33. The energizing circuit for the switch S extends from the conductor 32 through an interlock 35 on the switch P1, conductor 36 and the actuating coil of the switch S to the negative conductor 33.

When the voltage of the generator 10, which, as explained hereinbefore, is proportional to the speed of the locomotive, increases sufficiently to operate the relay T1, the transition from series to parallel is effected by the closing of the switch P1, the opening of the switch S and the closing of the switch P2. The switch P1 is closed immediately upon the operation of the relay T1 to close its contact members 26, thereby energizing the actuating coil of the switch P1 through a circuit which may be traced from the previously energized conductor 32, through the contact members 26, conductor 37 and the actuating coil of the switch P1 to the negative conductor 33.

The closing of the switch P1 interrupts the energizing circuit for the actuating coil of the switch S by opening the interlock 35, thereby causing the switch S to open. The opening of the switch S establishes an energizing circuit for the actuating coil of the switch P2 which may be traced from the conductor 32 through an interlock 38 on the switch P1, conductor 39, interlock 41 of the switch S, conductor 42 and the actuating coil of the switch P2 to the negative conductor 33. The closing of the switch P2 completes the transition from series to parallel.

It will be noted that the energizing circuit for the actuating coil of the switch GF is interrupted by the operation of the relay T1 to open its contact members 25. In this manner the switch GF is opened to insert the resistor 22 in the circuit for the field winding 13 of the generator 10, thereby reducing the voltage of the generator during the transition period. Following the completion of the transition, the switch GF is reclosed by the energization of its actuating coil through a circuit which extends from the conductor 32, through an interlock 43 on the switch P2, to conductor 34, and hence through the actuating coil of the switch GF to the negative conductor 33. Accordingly, full-field excitation is applied to the generator 10 immediately upon the completion of the transition of the motors 11 and 12 from series to parallel-circuit relation.

The reverse transition from parallel to series circuit-relation is automatically effected by the operation of the relay T1 to open its contact members 26 and reclose its contact members 25 upon a reduction of the generator voltage as a result of a decrease in the speed of the locomotive or an overloading of the generator. The opening of the contact members 26 of the relay T1 de-energizes the actuating coil of the switch P1 thereby opening this switch. Following the opening of the switch P1 the switch S is closed by the energization of its actuating coil through the interlock 35 carried by the switch P1. The closing of the switch S interrupts the energizing circuit for the actuating coil of the switch P2 by the opening of the interlock 41 carried by the switch S. It will be noted that the switch P2 remains closed until after the switch S is closed, since its actuating coil remains energized through a circuit provided by interlock 44 which is connected in parallel circuit-relation to the interlock 38 on the switch P1. Therefore, at least one of the motors is always connected across the generator during the transition period and at no time is the tractive effort entirely lost.

From the foregoing description, it is apparent that I have provided a system for automatically controlling the transition of electric motors from series to parallel circuit-relation and from parallel back to series-circuit relation, which is extremely simple and requires a relatively small amount of equipment. The automatic operation is controlled by one relay in cooperation with a few interlocks which are standard equipment on switches of the type utilized for controlling the motor connections on an electrically propelled vehicle. Accordingly the present system avoids the use of several of the relays previously required in automatic transition systems of the present type. Therefore, it is apparent that the present system may be readily applied to any locomotive or other vehicle of the type herein described.

I do not desire to be restricted to the particular form or arrangement of parts herein shown and described, since it is evident that they may be changed and modified without departing from the spirit and scope of my invention as defined in the appended claims.

I claim as my invention:

1. In a control system, in combination, a plurality of electric motors, a generator for supplying current to the motors, a switch for connecting the motors in series-circuit relation, additional switches for connecting the motors in parallel-circuit relation, said switches being separately operable in sequential relation, interlocking means actuated by said switches for controlling the sequence of operation of said switches, and a single relay responsive solely to the generator voltage and cooperating with said interlocking means to so control the transition of the motors from parallel to series-circuit relation that at least one of said motors is always connected to the generator during the transition period.

2. In a control system, in combination, a plurality of electric motors, a generator for supplying current to the motors, a switch for connecting the motors in series-circuit relation, additional switches for connecting the motors in parallel-circuit relation, said switches being separately operable in sequential relation, interlocking means actuated by said switches for controlling the sequence of operation of said switches, and a single relay responsive solely to the generator voltage and cooperating with said interlocking means to so control the transition of the motors from series to parallel and from parallel to series-circuit relation that at least one of said motors is always connected to the generator during the transition periods.

3. In a control system, in combination, a plurality of electric motors, a generator for supplying current to the motors, a switch for connecting the motors in series-circuit relation, a controller for controlling the operation of said switch, additional switches for connecting the motors in parallel-circuit relation, said switches being separately operable in sequential relation, interlocking means actuated by said switches for controlling the sequence of operation of said switches, and a single relay responsive solely to the generator voltage and cooperating with said interlocking means to so control the transition of the motors from parallel to series-circuit relation that at least one of said motors is always connected to the generator during the transition period.

4. In a control system, in combination, a plurality of electric motors, a generator for supplying current to the motors, a switch for connecting the motors in series-circuit relation, a controller for controlling the operation of said switch, additional switches for connecting the motors in parallel-circuit relation, said switches being separately operable in sequential relation, interlocking means actuated by said switches for controlling the sequence of operation of said switches, and a single relay responsive solely to the generator voltage and cooperating with said interlocking means to so control the transition of the motors from series to parallel and from parallel to series-circuit relation that at least one of said motors is always connected to the generator during the transition periods.

5. In a control system, in combination, a plurality of electric motors, a generator for supplying current to the motors, means for varying the generator excitation, a switch for connecting the motors in series-circuit relation, a controller for controlling the operation of said switch, additional switches for connecting the motors in parallel-circuit relation, said switches being separately operable in sequential relation, interlocking means actuated by said switches for controlling the sequence of operation of said switches, a single relay responsive solely to the generator voltage and cooperating with said interlocking means to so control the transition of the motors from series to parallel and from parallel to series-circuit relation that at least one of said motors is always connected to the generator during the transition periods, and additional interlocking means on the switches cooperating with the relay to control the operation of the excitation varying means to reduce the generator excitation during transition from series to parallel.

6. An electric motor control system comprising a direct current generator, a pair of direct current motors, a plurality of interlocked switching means for connecting said motors to said generator in series or parallel circuit relation, and a relay responsive to the voltage of said generator for controlling said switching means to transfer said motor from series to parallel circuit relation and to retransfer said motors from parallel to series circuit relation.

7. An electric power system comprising an internal combustion engine, a direct current generator driven by said engine, a pair of direct current motors, switching means for connecting said motors to said generator in series or parallel circuit relation, a relay responsive to the voltage of said generator for controlling said switching means, said relay picking up at a predetermined high generator voltage to transfer said motors from series to parallel circuit relation and dropping out at a predetermined low generator voltage to retransfer said motors from parallel to series circuit relation, and means controlled by said relay for reducing the excitation of said generator during said transfer operation and maintaining said excitation at its full value during said retransfer operation.

8. An electric power system comprising an internal combustion engine, a direct current generator driven by said engine, a pair of direct current motors, switching means for connecting said motors to said generator in series or parallel circuit relation, a relay responsive to the voltage of said generator for controlling said switching means, said relay picking up at a predetermined high generator voltage to transfer said motors from series to parallel circuit relation and dropping out at a predetermined low generator voltage to retransfer said motors from parallel to series circuit relation, means for reducing the field excitation of said generator, means controlled by said relay for effecting operation of said field reducing means during said transfer operation, and means controlled by said switching means for rendering said field reducing means ineffective during said retransfer operation.

ROBERT M. STRONG.

REFERENCES CITED

The following references are of record in the file of this patent:

UNITED STATES PATENTS

| Number | Name | Date |
| --- | --- | --- |
| 2,264,853 | McNairy | Dec. 2, 1941 |
| 2,266,326 | Lillquist | Dec. 16, 1941 |
| 2,292,203 | Cowin | Aug. 4, 1942 |
| 1,871,472 | Sawyer | Aug. 16, 1932 |
| 2,056,783 | Franz | Oct. 6, 1936 |
| 1,860,523 | Austin et al. | May 31, 1932 |